United States Patent [19]

Schnöring et al.

[11] 3,954,713

[45] May 4, 1976

[54] POLYCARBONATE POWDER

[75] Inventors: Hilla Schnöring, Wuppertal-Elberfeld; Hugo Vernaleken; Dieter Margotte, both of Krefeld; Josef Witte, Cologne-Stammheim, all of Germany

[73] Assignee: Bayer Aktiengesellschaft, Leverkusen, Germany

[22] Filed: Aug. 22, 1974

[21] Appl. No.: 499,710

Related U.S. Application Data

[63] Continuation of Ser. No. 294,393, Sept. 28, 1972, abandoned.

[30] Foreign Application Priority Data

Oct. 2, 1971  Germany............................ 2149308

[52] U.S. Cl. .............................. 260/47 XA; 260/49; 260/77.5 D; 260/96 R
[51] Int. Cl.² ........................ C08G 63/62; C08J 3/14
[58] Field of Search ...................... 260/47 XA, 78.5

[56] References Cited
UNITED STATES PATENTS

| | | | |
|---|---|---|---|
| 3,117,941 | 1/1964 | Knobloch et al. | 260/2.5 B |
| 3,294,741 | 12/1966 | Schnell et al. | 260/47 XA |

OTHER PUBLICATIONS

Chemical Abstract, Vol. 60 Col. 3103d (1963).
Chemical Abstract, Vol. 62, Col. 9299b (1965).

*Primary Examiner*—Wilbert J. Briggs, Sr.
*Attorney, Agent, or Firm*—Lawrence S. Pope; Gene Harsh

[57] ABSTRACT

A process for manufacturing polycarbonate powder wherein a solution of polycarbonate in a water-immiscible solvent is emulsified in water which contains a very small amount of a laminator. The solvent is thereafter removed from the emulsion to form a dispersion of the polycarbonate powder. The polycarbonate powder settles out of the dispersion and is removed.

12 Claims, No Drawings

3,954,713

POLYCARBONATE POWDER

This is a continuation of application Ser. No. 294,393, filed Sept. 28, 1972, now abandoned.

BACKGROUND OF THE INVENTION

This invention relates to a process for the manufacture of polycarbonate powder.

The use of plastics in powder form is gaining increasing industrial importance. There is therefore a requirement for also isolating polycarbonates in the form of a uniform powder from their solutions in organic solvents in an industrially feasible process. Such powders should have as high a bulk density as possible and should be as free of impurities as possible.

Polycarbonates are in most cases manufactured from aromatic dihydroxy compounds and phosgene or bis-chlorocarbonic acid esters by thoroughly mixing an aqueous-alkaline solution of the bisphenol with a solution of the phosgene or bis-chlorocarbonic acid ester in a water-immiscible organic solvent, whereupon the polycarbonate formed dissolves in the organic solvent. Usually, methylene chloride is used as the solvent. After separating off the aqueous phase, a solution of the polycarbonate in the organic solvent is left.

It is thus an object of the present invention to provide a process to isolate the polycarbonate from a solution in an organic solvent, such as for example from the solution obtained during its manufacture, in the form of a homogeneous powder of high bulk density.

SUMMARY OF THE INVENTION

A process is provided according to the invention for manufacturing polycarbonate in powder form from solutions of the polycarbonate in a water-immisible organic solvent. The process of the invention comprises forming an emulsion of the polycarbonate solution in water which contains 50 to 5000 ppm of a laminator and thereafter removing the organic solvent from the emulsion to form a dispersion of the polycarbonate powder in the aqueous solution. The polycarbonate powder sediments from the dispersion and is easily removed.

DETAILED DESCRIPTION

In principle, all polycarbonates are suitable for the process. Polycarbonates which have been manufactured from dihydroxy compounds having one or more benzene rings are used in particular. Examples of suitable hydroxy compounds are dihydroxydiphenyls, dihydroxydiphenyl-sulphones, dihydroxydiphenyl oxides, dihydroxydiphenylalkanes (for example -methanes, -ethanes and $C_1-C_6$-alkanes, generally), dihydroxy-diphenylcycloalkanes (for example -cyclohexanes or -cyclopentanes) and dihydroxydiphenylketones. The hydroxyl groups of the compounds mentioned are preferably in the 4,4'-position.

Polycarbonates from 4,4'-dihydroxydiphenylpropane (bisphenol A), optionally mixed with halogenated bisphenol A (for example tetrachlorobisphenol A or tetrabromobisphenol A) or alkylated bisphenol A (tetramethylbisphenol A) are particularly preferred. Further, particularly suitable polycarbonates may additionally contain trifunctional or polyfunctional phenols, such as phloroglucinol 4,6-dimethyl-2,4,6-tris-(4-hydroxyphenyl)-heptene-2, 4,6-dimethyl-2,4,6-tri-(4-hydroxyphenyl)-heptane. 1,3,5-tri-(4-hydroxyphenyl)-benzene, 1,1,1-tri-(4-hydroxy-phenyl)-ethane, 2,2-bis-[4,4-(4,4'-dihydroxydiphenyl)-cyclohexyl]-propane and 1,4-bis-(4',4''-dihydroxy-tri-phenyl-methyl)-benzene. Further suitable bisphenols are described in U.S. Pat. Nos. 3,028,365, 2,999,835, 3,148,172, 2,991,273, 3,271,367, 3,280,078, 3,014,891, 2,999,846, 3,271,368 and 2,970,137.

The molecular weights of the polycarbonates used for the process according to the invention may lie between 2,000 and 200,000. Polycarbonates with molecular weights of between 15,000 and 50,000 are preferentially used.

Chlorinated hydrocarbons, for example methylene chloride, chloroform and 1,2-dichloroethane, are particularly suitable as water-immiscible organic solvents for polycarbonates. It is, however, also possible to use other known water-immiscible solvents for polycarbonates such as, for example, 1,1-dichloroethane, 1-chloropropane, 2,2-dichloropropane, 1,1-dichloropropane, trifluoroethane.

The polycarbonate solutions used for the process may contain between 5 and 50% by weight, preferably 15 – 30% by weight, of poly-carbonate. The viscosity of these solutions at 40°C may be up to 250 poise.

The term "laminator" is used herein to define linear high polymer substance of very high molecular weight, that is to say, very long chain molecules, which are water-soluble in low concentrations. More specifically, laminators are defined as linear high polymers which reduce the resistance index of water in turbulent flow, by at least 10% when dissolved in the water in a concentration of 0.05 by weight and at the same time increase the viscosity of the water. Both effects must occur simultaneously. A viscosity increase alone is not sufficient. For example, dilute gelatine solutions in water fulfill the viscosity condition, but do not reduce the resistance index of the water. Gelatine is thus not a laminator.

The laminator property as a physical phenomenon is independent of the chemical composition of molecules. For this reason laminators are found in various classes of chemical compounds. Examples of laminators useful in the invention are carboxymethyl celluloses, hydroxyethyl celluloses, polyacrylamides, polyacrylic acids and styrene maleic acid copolymers with a minimum molecular weight of $5 \cdot 10^5$, preferably with a molecular weight of between about $1 \cdot 10^6$ and $4 \cdot 10^6$.

Particularly suitable laminators are defined by their viscosity ($\eta$) determined in 1% by weight aqueous solution and expressed in centipoise, and simultaneously by the decrease in the resistance index in turbulent flow expressed in % which is observed when the resistance index of pure water is compared to the resistance index of an 0.05% aqueous solution of the laminator. The decrease in the resistance index will in the following be termed $D$. $D$ is defined as follows:

$$D (\%) = \frac{R_w - R_l}{R_w} \times 100$$

$R_w$ = Resistance index of water
$R_l$ = Resistance index of 0.05 % laminator solution Generally laminators have ($\eta$) $\geq$ 500 cP. and D $\geq$ 10%. Preferred laminators are carboxymethyl cellulose having ($\eta$) = 1,000 to 8,000 cP. and $D = 10$ to 60%, more especially ($\eta$) = 3,000 cP. $D = 45\%$, hydroxyethyl celluloses having ($\eta$) = 2,000 to 10,000 cP and D = 10 to 60%, more especially (η) = 3,800 cP, D = 20%, polyacrylamides having (η) = 500 to 5,000 cP and D = 10 to 40%, more especially (η) = 1,000, D = 2090, styrene maleic acid copolymers having (η) = 1,000 to 5,000 cP, D = 10 to 45%, more especially (η) = 1,200 cP, D = 23%, polyacrylic acid having (η) = 250 to 5,000 cP, D = 10 to 70%, more especially (η) = 850 cP, D = 45%. Furthermore corresponding copolymers of acrylamide and acrylic acid are also suitable.

To carry out the process according to the present invention, the concentration of the laminator in water must be from 5000 to 50, preferably from 3000 to 50 and most preferably from 500 to 50 ppm. It has been found, surprisingly, that these extremely small amounts of laminator suffice to form a stable emulsion of the polycarbonate solution in water but do not suffice to form a stable suspension or a stable latex after removal of the organic solvent, even though the volume of the disperse phase is then greatly reduced so that the suspension or the latex should actually be more stable than the emulsion.

The process of the present invention can be carried out generally as follows: the solution of a polycarbonate in one of the above mentioned water-immiscible organic solvents, preferably a 5 to 50% strength by weight solution, is thoroughly mixed with the water containing the laminator. About 0.1 to 3 parts by weight of polycarbonate solution can be used per part by weight of water. The mixing of the two liquids can be effected in equipment which is customarily used for the production of emulsions, for example ultrasonic equipment. On mixing, a stable emulsion of the polycarbonate solution in water forms. The emulsion does not break even on prolonged standing albeit it does not contain an emulsifier but only very small amounts of laminator.

The organic solvent is then withdrawn from the emulsion, for example by distillation wherein a suspension of polycarbonate particles in water, a so-called latex, is formed, with the size and concentration of the suspended carbonate particles being predetermined by the concentration of the emulsion, the size of the emulsified polycarbonate solution droplets and the concentration of the polycarbonate solution. Surprisingly, this suspension is not stable and instead the polycarbonate particles sediment after a short time. In general, 99.5 to 99.9% of the polycarbonate has sedimented after standing for about 10 to about 30 minutes. The aqueous phase can then be removed by one of the customary methods of liquid-solid separation, for example decanting, filtration or centrifuging. The polycarbonate is left in the form of a powder which can be dried in a usual manner.

It is entirely surprising that a stable emulsion is produced from which the organic solvent can be removed even by distillation, but no stable latex is produced though after withdrawal of the solvent because smaller polycarbonate particles are present, which ought to remain dispersed more easily. It is furthermore surprising that it is possible, with the small amounts of laminator of 5000 to 50 ppm, to produce emulsions which consist to the extent of 75% by weight of polycarbonate solution.

The polycarbonate powders obtained according to the invention in general have a bulk density of 0.2 to 0.7 g/cm³. The polycarbonate powders consist wholly of or at least very predominantly of compact spherical particles of smooth surface, the diameter of which is between about 10 and 1000 μ, preferably 50 and 500 μ. In general, particles of a fairly uniform size, that is to say a relatively small particle size distribution spectrum, are obtained. For thermoplastic processing particle diameters of 100 to 1000 μ, preferably 100 to 500 μ are preferred, and for coating and rotation casting the range of 50 to 100 μ is most preferred. The bulk density is higher when less laminator has been used. The resulting polycarbonate powders are practically free of foreign constituents because the laminator, which is in any case present in very small amounts, is separated from the polycarbonate together with the water. In contrast to customary emulsifiers, the laminators do not adhere to the surface of the dispersed material. Since practically the entire amount of laminator employed remains in the water, it is possible to re-use the water containing laminator for the process.

Apparatus in which the manufacture of the emulsion may be carried out are, for example, high speed stirrer systems or circulatng reactors using pumps, in which the two-phase mixture is repeatedly passed through a high speed centrifugal pump. In addition, it is possible to use all known apparatus in which the work necessary for division of the phase can be applied, such as, for example, jets or capillaries.

The conversion of the emulsion into unstable suspensions, or dispersions, is effected by distillation of the solvents. Here again, special embodiments such as thin layer evaporation or distillation in descending film evaporators or flash evaporators can be used.

After the solvent has been removed from the emulsion, only very low dwell times are required for the separation of the unstable suspension.

Industrially known apparatus such as suction filters, filter presses, rotary filters, decanters and separators are preferentially used for isolating the water-moist solid. The remaining water is then withdrawn in driers, in accordance with known techniques.

The preferred embodiment of the process according to the invention is the isolation of polycarbonate powders from dilute polycarbonate solutions such as are obtained by the process of phase boundary phosgenation of bisphenols.

A further embodiment of the process according to the invention is the isolation of polycarbonate powders from solutions which contain mixtures of polycarbonate based on different bisphenols. Because of their differing melt properties and flow properties such polymer mixtures are frequently difficult to isolate by distillation of the solvents in, for example, evaporator screws. These difficulties are overcome by the present process.

The polycarbonate solutions which according to this variant of the process are obtained with a solids content of approx. 20 – 30% by weight in methylene chloride as the solvent are converted into stable emulsions in an aqueous laminator solution by means of an ultrasonic machine and subsequently unstable suspensions are obtained from these emulsions by distillation of the solvent in a descending film evaporator. The sedimented polycarbonate solid is isolated by filtration and subsequently dried, while the aqueous phase which contains laminator is re-used for the manufacture of the emulsion. The powders produced can be mixed in accordance with customary processes with fillers, pigments, stabilizers, mold release agents and additives and can directly be thermoplastically processed. A further form of use of the powders is to employ them in the field of powder lacquering for the manufacture of coatings.

The term "resistance index" used in this specification and its measurement is described in VDI-Forschungsheft 356, published by VDI-Verlag, Berlin, 1932 and in VDI-Forschungsheft 361, published by VDI-Verlag, Berlin, 1933. The author is I. Nikuradse.

Resistance index (Widerstandszahl) is defined as $$\lambda = \frac{dp}{dx} \cdot \frac{4\pi^2}{\rho Q^2} \cdot r^5$$

wherein $dp/dx$ = pressure gradient
$p$ = pressure
$x$ = length of tube
$\rho$ = density
$Q$ = throughput per unit of time
$r$ = radius of tube In determining the value of $\lambda$ water is caused to flow through a tube of constant and exactly known diameter. Pressure is determined at two points arranged at a distance $x$. Through put is determined by measuring the outflow from the tube per second. The tube used had an internal diameter of 10 mm ($r$ = 5 mm) × was 240 mm.

In the following examples $\eta$ and $D$ are defined as explained in the specification.

EXAMPLE OF THE MANUFACTURE OF A POLYCARBONATE 454 parts by weight of 4,4'-dihydroxydiphenylpropane-2,2-(bisphenol A) and 9.5 parts by weight of p-tert-butyl-phenol are suspended in 1,500 parts by weight of water in a three-neck flask equipped with a stirrer and gas inlet tube. Pure nitrogen is passed over the suspension for 15 minutes and 355 parts by weight of a 45% strength by weight sodium hydroxide solution and 1,000 parts by weight of methylene chloride are then added. The reaction mixture is cooled to 20° - 25°C and 237 parts by weight of phosgene are passed in over the course of one hour. During the introduction of the phosgene the pH value is kept at pH 14, if necessary, by addition of sodium hydroxide. After completion of the addition of phosgene, 1.6 parts by weight of triethylamine are added to the mixture and the mixture is stirred for an additional 30 minutes. Thereafter the organic phase is separated from the sodium hydroxide solution and is washed first with phosphoric acid and then with water until neutral and free of electrolyte. The polycarbonate isolated from this solution has a relative viscosity of 1.32 (measured in methylene chloride at 20°C at a concentration of 0.5 g per liter). The resulting solution of the polycarbonate in methylene chloride is initially of about 20% strength by weight. It can be used directly for the process according to the invention but it is also possible to concentrate or to dilute the solution.

EXAMPLE 1

An emulsion, with 50% by weight of polycarbonate solution as the disperse phase, is manufactured from an 0.025% by weight aqueous solution of, as the laminator, a copolymer of styrene and maleic acid (Molecular weight $1.2 \times 10^6$, $\eta$ = 3000 cp (in 1% aqueous solution; $D$ = 45%) and 15% by weight polycarbonate solution in methylene chloride (obtained by diluting the polycarbonate solution obtained in accordance with the manufacturing instruction given above). The emulsion is manufactured continuously by a single pass through a "Supraton" machine D 305 manufactured by the firm Deutsche Supraton, Bruchmann u. Zucker K.G., 4041 Rosellen, Federal Republic of Germany, with coaxial two-component inlet, at a throughput of several m³/hour. The methylene chloride was distilled from this emulsion in a stirred vessel under normal pressure (760 mm) at a temperature of 40°-80°C, in the course of which not objectionable development of foam occurred. After the end of the distillation, the stirrer was switched off and after 30 minutes the bulk of the aqueous phase, which contained less than 0.2% of suspended polycarbonate, was decanted. The remaining sediment had a moisture content of 78 % and was dewatered to a moisture content of 55% by suction filtration. The aqueous phase separated off was recycled to the emulsification process. After thermal drying, the polycarbonate powder had an average particle size of 90 $\mu$ and a bulk density of 0.58 g/cm³.

EXAMPLE 2

The process of Example 1 was carried out but instead of the 15% by weight polycarbonate solution a 28% by weight polycarbonate solution in methylene chloride was employed.

After drying, a polycarbonate powder of average particle size 120 $\mu$ and bulk density 0.64 g/cm³ was obtained.

EXAMPLE 3

A 50% by weight emulsion was manufactured from an 0.0075 % by weight aqueous solution of the styrene-maleic acid copolymer according to Example 1 and the 15% by weight poly-carbonate solution of Example 1, and, as in Example 1, the solvent was distilled off and 10 minutes after switching off the stirrer the sediment was separated from the supernatant aqueous phase. The polycarbonate concentration of the separated aqueous phase was less than 0.11 %. The aqueous phase was again employed for the emulsification. The product obtained after drying had an average particle size of 180 $\mu$ and a bulk density of 0.72 g/cm³.

EXAMPLE 4

A 40% by weight emulsion was manufactured from an 0.05% by weight aqueous solution of hydroxyethylcellulose having a molecular weight of 1,500,000 ($\eta$ = 3,800 cp, $D$ = 20%) and the 15% by weight of polycarbonate solution from Example 1, and the emusion was worked-up in accordance with the data of Example 1. After drying a polycarbonate powder of bulk density 0.35 g/cm³ and of average particle size 70 $\mu$ was obtained. A suitable hydroxyethylcellulose is sold by the firm Herkules N.V., Netherlands under the tradename Natrosol 250 HH.

EXAMPLE 5

The procedure of Example 4 was followed but an 0,04% by weight aqueous solution of a carboxymethylcellulose having a molecular weight of 1,200,000. ($\eta$ = 3000 cp, $D$ = 45%) was used as the laminator solution. In this case, a polycarbonate powder of bulk density 0.4 g/cm³ and average particle size 80 $\mu$ was produced.

EXAMPLE 6

The procedure of Example 1 was followed but a 25% by weight of the polycarbonate solution in methylene chloride was used and an emulsion containing 70% by weight of this solution was manufactured. After withdrawing the solvent and drying, a polycarbonate powder of bulk density 0.72 g/cm³ and average particle size 120 μ was produced.

EXAMPLE 7

Powders are manufactured in accordance with the procedure of Example 1 from polycarbonates of the composition shown below. The average particle size and the bulk density are also listed in the table which follows:

| | Bisphenol A mol % | Tetrachloro-bisphenol A mol % | Tetrabromo-bisphenol A mol % | Tetramethyl bisphenol A mol % | $\eta_{rel}^{(x)}$ | Average Particle Size μ | Bulk Density g/cm³ |
|---|---|---|---|---|---|---|---|
| a) | 92 | 8 | — | — | 1.28 | 70 | 0.60 |
| b) | 30 | 70 | — | — | 1.24 | 60 | 0.52 |
| c) | 94 | — | 6 | — | 1.25 | 90 | 0.71 |
| d) | — | — | — | 100 | 1.30 | 100 | 0.60 |

Powders of average particle size 105 μ and bulk density 0.65 are obtained in the same manner from polycarbonates which contain 0.3 mol % of tris-cresol and have a relative viscosity of 1.34.

$^{(x)}$relative viscosity $\eta_{rel} = \dfrac{\eta_{solution} - \eta_{solvent}}{\eta_{solvent}}$ (measured in methylene chloride at 25°C and a concentration of 5 g/l).

EXAMPLE 8

Powders were manufactured in accordance with Example 1 from polycarbonates based on bisphenol A and having different molecular weights. The concentrations of the polycarbonate solutions in methylene chloride which were used, as well as the average particle sizes and the bulk densities, can be seen in the table below:

| | $\eta_{rel}^{(x)}$ | Molecular weight | Concentration of the Methylene Chloride Solution, % by weight | Average Particle Size, μ | Bulk Density, g/cm³ |
|---|---|---|---|---|---|
| a) | 1.10 | 10,000 | 30 | 50 | 0.47 |
| b) | 1.75 | 80,000 | 15 | 75 | 0.59 |
| c) | 2.08 | 120,000 | 10 | 95 | 0.70 |

$^{(x)}$relative viscosity measured in methylene chloride at 25°C and a concentration of 5 g/l.

EXAMPLE 9

Powders are manufactured in accordance with Example 1 from solutions of polycarbonates based on bisphenol A in dichloroethane or tetrachloroethane. The concentration of the polycarbonate solutions, the average particle size and the bulk densities can be seen in the tabulation below:

| Solvent | Concentration % by weight | Average Particle Size μ | Bulk Density g/cm³ |
|---|---|---|---|
| a) Dichloroethane | 10 | 55 | 0.60 |
| b) Tetrachloroethane | 5 | 45 | 0.55 |

From the examples it is clear that polycarbonate powder may be manufactured from polycarbonates of different compositions dissolved, in varying concentrations, in various water-immiscible organic solvents according to the process of the invention. It is also clear from the examples that polycarbonate powder of various particle size and bulk density may be manufactured according to the invention by varying the type and concentration of the laminator in the aqueous solution as well as the size of the emulsified particles of polycarbonate solution, organic solvent, molecular weight and type of polycarbonate and the like. The effect of these variables on the polycarbonate powder is, of course, within the expertise of and can readily be determined by one skilled in the polycarbonate art.

While the invention has been described in accordance with the foregoing examples it is understood that the invention is not limited thereto but rather includes all alternatives and embodiments as are encompassed within the scope and spirit of the appended claims.

What is claimed is:

1. A process for the production of polycarbonate powder from a solution of a polycarbonate in a water-immiscible organic solvent comprising the steps of:
   a. emulsifying the solution of polycarbonate in water containing 50 ppm to 500 ppm of a styrene-maleic acid copolymer having a viscosity $\eta$ — (determined in a 1% by weight aqueous solution) of between about 1000 cP and 5000 cP and a decrease in resistance index, $D$, of between about 10 and 45%, said decrease in resistance index, $D$, being defined by the formula:

$$D (\%) = \dfrac{R_W - R_L}{R_W} \times 100$$

where $R_W$ is the resistance index of water and $R_L$ is the resistance index of a 0.05% by weight aqueous solution of the styrene-maleic acid copolymer;
   b. separating the organic solvent from the emulsion formed in (a) to obtain a suspension of polycarbonate powder in water, and
   c. isolating the polycarbonate powder from the water.

2. The process of claim 1 wherein the solution of the polycarbonate has a concentration of 5 to 50 wt.%.

3. The process of claim 1 wherein the solution of the poly-carbonate has a concentration of 15 to 30 wt. %.

4. The process of claim 1 wherein the solution of the poly-carbonate has a viscosity of up to 250 poise at 40°C.

5. The process of claim 1 wherein the water-immiscible organic solvent is a chlorinated hydrocarbon.

6. The process of claim 1 wherein the polycarbonate is based on a chlorine, bromine or methyl-substituted dihydroxydiphenylalkane.

7. The process of claim 1 wherein the polycarbonate is a copolycarbonate of bisphenol A and a halogenated bisphenol A or alkylated bisphenol A.

8. The process of claim 1 wherein the emulsion comprises 0.1 to 3 parts by weight of polycarbonate solution per part by weight of water.

9. The process of claim 1 wherein the suspension is allowed to stand for 10 to 30 minutes to enable the polycarbonate to sediment.

10. The process of claim 1 wherein the polycarbonate is produced by phase boundary phosgenation of at least one bisphenol.

11. The process of claim 1 wherein the polycarbonate in solution consists of a mixture of polycarbonates each based on a different bisphenol.

12. The process of claim 1 wherein the solution of polycarbonate is emulsified in water using ultrasonic vibration, the organic solvent is separated from the emulsion in a descending film evaporator, the sedimented polycarbonate is filtered off from said water containing the styrene-maleic acid copolymer, and the said water is recycled.

* * * * *